(12) United States Patent
Hong

(10) Patent No.: US 11,332,806 B2
(45) Date of Patent: May 17, 2022

(54) METHOD AND SYSTEM FOR DESULFURIZATION AND DEZINCIFICATION OF TAILINGS

(71) Applicant: Kun-Liang Hong, Tainan (TW)

(72) Inventor: Kun-Liang Hong, Tainan (TW)

( * ) Notice: Subject to any disclaimer, the term of this patent is extended or adjusted under 35 U.S.C. 154(b) by 444 days.

(21) Appl. No.: 16/412,545

(22) Filed: May 15, 2019

(65) Prior Publication Data
US 2020/0024684 A1 Jan. 23, 2020

(30) Foreign Application Priority Data

Jul. 18, 2018 (TW) .................................. 107124845

(51) Int. Cl.
*C01B 17/16* (2006.01)
*C22B 1/11* (2006.01)
*C25C 1/06* (2006.01)

(52) U.S. Cl.
CPC .............. *C22B 1/11* (2013.01); *C01B 17/165* (2013.01); *C25C 1/06* (2013.01)

(58) Field of Classification Search
CPC ... C01B 17/165; C01B 17/027; C01B 17/033; C01B 17/06; C25C 1/06; C22B 1/11; B01J 8/00; B01J 19/00; B01J 19/0086; B01J 19/088; B01J 2219/00; B01J 2219/00177; B01J 2219/0805; B01J 2219/0892
See application file for complete search history.

(56) References Cited

U.S. PATENT DOCUMENTS

| | | | | |
|---|---|---|---|---|
| 2,898,196 A | * | 8/1959 | Forward | ................. C01B 17/06 |
| | | | | 423/26 |
| 3,063,817 A | * | 11/1962 | Simpson | ............... C01B 17/033 |
| | | | | 423/578.1 |
| 3,821,355 A | * | 6/1974 | Bandyopadhyay et al. ................. |
| | | | | C22B 3/24 |
| | | | | 423/139 |
| 4,049,770 A | * | 9/1977 | Swinkels | ................... C22B 3/08 |
| | | | | 423/37 |
| 2003/0215696 A1 | * | 11/2003 | Chuang | ................... H01M 4/90 |
| | | | | 429/480 |

* cited by examiner

*Primary Examiner* — Timothy C Vanoy
(74) *Attorney, Agent, or Firm* — Rosenberg, Klein & Lee

(57) ABSTRACT

A method for desulfurization and dezincification of tailings includes the step of passing tap water into a high oxidation reduction electrocatalytic water equipment to reduce the pH value of tap water to 1-2, mixing a specific ratio of the pH value 1-2 acid electrocatalytic water with low-quality high-sulfur iron in the tailings, heating the mixture to let $H^+$ in the acid electrocatalytic water be reacted with sulfur and zinc in the low-quality high-sulfur iron and to further cause generation of an ion state of hydrogen sulfide gas where the volatilization of water vapor effectively removes the sulfur and zinc elements in the low-quality high-sulfur iron and the hydrogen sulfide gas thus generated is collected.

6 Claims, 3 Drawing Sheets

METHOD AND SYSTEM FOR DESULFURIZATION AND DEZINCIFICATION OF TAILINGS

BACKGROUND OF THE INVENTION

1. Field of the Invention

The present invention relates to mineral processing technology and more particularly, to a method for desulfurization and dezincification of tailings. This invention also provides a system for the implementation of the method for desulfurization and dezincification of tailings.

2. Description of the Related Art

Mineral dressing is the sorting and grading of the mined ore, so that the useful minerals are enriched to meet smelting requirements, or to achieve the quality level required for certain use. After the ore is ore-selected, the useful mineral part obtained becomes a concentrate. The part that cannot be used or not intended for use in the temporary fashion is the tailings.

The general mineral dressing process mainly includes three basic processes of crushing, grinding and sorting. The concentrate obtained from the ore dressing is transported to the smelting plant or the user, and the tailings are discharged to the tailings pond on the spot or nearby.

Current status of iron tailings:

Each 1 ton of iron concentrate will produce 2.5~3 tons of tailings. The tailings of China iron mines has the characteristics of fine grain size, various types and complex nature.

According to the 1996 China Black Metallurgical Mine Statistical Annual Report, the iron ore plants bought a raw ore volume of 215 million tons, and the tailings discharged amounted to 130 million tons, accounting for 60.46% of the ore content.

The national key iron ore dressing plants bought a raw ore volume of 110 million tons, and the amount of tailings discharged was 58.026 million tons, accounting for 52.75% of the ore.

At present, the amount of iron tailings recommended by China is more than one billion tons, accounting for nearly one-third of the total tailings stockpiles. The re-selection of iron tailings has attracted the attention of iron and steel enterprises. Therefore, iron has been recovered from iron tailings in many different ways, and the economic benefits are higher.

The tailings resources of the iron ore dressing plants can be divided into two categories: single metal iron tailings and polymetallic iron tailings according to the content of associated elements. Different ore types require different mine dressing processes. Different tailings produced by different mine dressing processes have certain differences in process properties, especially in particle morphology and particle gradation. For this reason, the classification process of tailings processing process is formed.

According to the mine dressing process, tailings can be divided into the following types:

1. Hand-selected tailings:

Because hand-selected tailings are mainly suitable for metal or non-metallic ore with tight structure, high grade and obvious gangue boundary, tailings generally show large waste rock. According to the different processing degree of raw ore, it can be further divided into ore-like tailings and gravel-like tailings. The former has a large difference in particle size, but it is mostly between 100~500 mm, and the latter is mostly between 20~100 mm. This type of tailings is suitable for use as a coarse aggregate for concrete materials.

2. Re-selected tailings:

Re-election is to select according to density difference and particle size difference between ore minerals and gangue minerals. Generally, the multi-stage grinding process is adopted, which results in a relatively wide range of tailings. When the partition storage is adopted, a single-stage tailings can be obtained. When the mixed storage is adopted, a continuous-grade tailings meeting the requirements of a certain grade can be obtained.

According to the principle of action and mineral processing machinery, it can be further divided into jigging tailings, heavy medium tailings, shaker tailings, chute tailings, etc. The first two types of tailings are coarser, generally larger than 2 mm; the latter two types of tailings are finer, generally less than 2 mm.

This kind of tailings is very favorable for the gas permeability during high-temperature melting and the venting property during press molding, and it is the most widely used in tailings building materials.

3. Magnetic separation tailings:

Magnetic separation is mainly used to select ferromanganese ore with strong magnetic properties. Tailings are generally rock-forming minerals containing a certain amount of iron, with a wide range of particle sizes ranging from 0.05 mm to 0.5 mm. When magnetically selecting weak magnetic minerals, the minerals need to be roasted first. Because the tailings obtain certain reactivity during the roasting process, they are especially suitable for the production of hydrated synthetic silicate products.

4. Electrification tailings:

At present, this kind of mineral processing is less used, and it is usually used for sorting precious minerals in sand deposits or tailings. The tailings granularity is generally less than 1 mm.

5. Floatation tailings:

Flotation is the most common ore dressing method for non-ferrous metal minerals. The typical characteristics of floatation tailings are small grain size, usually between 0.5 and 0.05 mm, and very fine particles of less than 0.074 mm account for the majority.

The surface of the newly discharged tailings particles sometimes has ore dressing agent adhered thereto, which has certain influence on the building materials production. However, after a certain storage period, the influence of the ore dressing agent will disappear automatically.

6. Chemical treatment processed tailings:

When the chemical agent leaches the useful elements, it causes a certain degree of corrosion or changes the surface state of the tailings particles, which generally improves the reactivity, and is favorable for the formation of the hydration reaction type building materials. However, sometimes the residual chemical agents will also have an adverse effect on the durability of the building materials. When used, they should be analyzed according to the specific conditions.

The problem of low comprehensive utilization of tailings:

In terms of China, the current total recovery rate of mineral resources can reach about 30%, which is 20% lower than the foreign level. In terms of the recovery rate of the mining, the iron ore is 67%, the non-ferrous metal mine is 50%~60%, the non-metallic mineral is 20%~60%, and the selection of beneficial components with a comprehensive utilization rate of 75% only accounts for 2% of the total number of selected plants, while the comprehensive utilization rate of more than 70% of the semi-finished comprehensive mines is less than 2.5%. What is more noteworthy is that the concomitant components of some mines even exceed the value of minerals, but these concomitant components are not used in the tailings of the main minerals. For example, in the case of non-ferrous metals, the amount of non-ferrous metals lost in tailings is 200,000 tons per year, and the value is more than 2 billion. The utilization rate of foreign tailings can reach more than 60%. Some small countries in Europe have developed to the goal of no-waste mines, and the utilization rate of China's tailings is only about 7%, a big gap.

SUMMARY OF THE INVENTION

The present invention has been accomplished under the circumstances in view. It is therefore the main object of the present invention to provide a method for desulfurization and dezincification of tailings, which is to pass the tap water into a high oxidation reduction electrocatalytic water equipment for enabling the pH value of the tap water to be reduced to 1-2. The high oxidation reduction electrocatalytic water equipment is a reactor for continuously generating high oxidation reduction water as described in China Utility Application 201120312616.4, no more instruction here. The pH value 1-2 acid electrocatalytic water thus obtained is then mixed with low-quality high-sulfur iron in the tailings subject to a specific formula, and then the mixture is heated for a short period of time. In the process of heating, a large amount of $H^+$ in the acid electrocatalytic water is reacted with sulfur and zinc in the low-quality high-sulfur iron in the tailings, and the ion state of hydrogen sulfide gas is generated. In the process of heating, the volatilization of water vapor can effectively remove the sulfur and zinc elements in the low-quality high-sulfur iron in the tailings, thereby improving the quality of the iron ore to meet the steelmaking requirements. The hydrogen sulfide gas thus generated is collected into the ultra-gas battery flow device through a pipeline for further decomposition treatment. After high-sulfur iron desulfurization and dezincification, the total iron content is increased, the quality is also improved correspondingly, and the level of steelmaking is reached, so that the iron tailings which could not be used can be re-used as iron ore.

The exhaust gas generated by the heating process is guided into the gas-liquid separator where water vapor is separated from the exhaust gas. The exhaust gas is soluble gas. The water vapor is then guided into the circulating water recovery treatment tank while the exhaust gas is guided into the ultra-gas battery flow device for treatment. The ultra-gas battery flow device is the technology of China Patent Application 201310090394.X "Catalyst plasma and tunnel plasma containing the same" and 201010217588.8 "Uniform electric field dielectric discharge reactor" that were invented and filed by the applicant.

After high-sulfur iron desulfurization and dezincification, the total iron content is increased, the quality is also improved correspondingly, and the level of steelmaking is reached, so that the iron tailings which could not be used can be re-used as iron ore.

The main sulfur-containing substances of high-sulfur iron ore are mainly ferrous disulfide, ferrous sulfide and diiron trisulfide.

1. Ferrous disulfide: $FeS_2$ is a yellow crystal and is the main component of pyrite. It has diamagnetic properties. Pyrite has a melting point of 1171° C. and a density of 5.0 g/cm³ with a cubic lattice. $FeS_2$ is an inactive substance at room temperature, becomes active after temperature rise, is heated in air, and is oxidized to ferric oxide and sulfur dioxide. $FeS_2$ is heated in a vacuum to above 600° C. to obtain sulfur. Iron disulfide can be used in the sulfuric acid industry.

2. Ferrous sulfide: FeS is a brownish black block, having a melting point of 1193 to 1199° C. and a density of 4.74 g/cm³. It is insoluble in water. FeS is soluble in an aqueous acid solution while producing hydrogen sulfide. FeS is easily oxidized by heating in air and is heated to above 1100° C. in a vacuum to obtain sulfur. The ferrous sulfide can be obtained by direct reaction of two elements, or by the action of an aqueous solution of ferrous salt and an alkali metal sulfide. It can be used to generate hydrogen sulfide gas in the laboratory.

3. Diiron trisulfide: $Fe_2S_3$ is yellow-green solid; relative density is 4.3; it will be decomposed when strongly heated; it is insoluble in water and will be decomposed into ferrous sulfide and sulfur in hot water; in the case of strong acid decomposition, hydrogen sulfide gas is released.

The principle of the reaction of the acidic electrocatalytic water of the invention with each iron sulfide:

The high oxidation reduction electrocatalytic water equipment can rapidly decompose water into $H^+$ and $OH^-$ by electrocatalytic method, electrolysis method and high voltage method, and add acid water rich in $H^+$ to high-sulfur iron, supplemented by heating to accelerate the reaction of $H^+$ in water and S in iron sulfide. S is removed from the iron ore in the form of $H_2S$ gas, and $H_2S$ is collected into the ultra-gas battery flow device for further decomposition.

The main chemical reaction principle for sulfur control:

$$FeS+2H^+=Fe^{2+}+H_2S\uparrow$$

$$FeS_2+2H^+=Fe^{2+}+S\downarrow+H_2S\uparrow$$

$$Fe_2S_3+4H^+=S\downarrow+2Fe^{2+}+2H_2S\uparrow \quad \text{(Disproportionation reaction)}$$

$$4FeS+7O_2=2Fe_2O_3+4SO^2\uparrow$$

$$4FeS_2+11O_2=2Fe_2O_3+8SO_2\uparrow$$

$$H_2S+2Fe^{3+}=2Fe^{2+}+2H^++S\downarrow$$

$$2H_2S+SO_2=2H_2O+3S\downarrow \quad \text{(Centralization reaction)}$$

The main chemical reaction principle of zinc removal:

$$ZnO+2H^+=Zn^{2+}+H_2O$$

$$ZnFe_2O_4+8H^+=Zn^{2+}+4H_2O+2Fe^{3+}$$

Hydrogen sulfide treatment and its properties:

Molecular Structure: The central atom S atom adopts $sp^3$ hybridization (actually, the result calculated by the bond angle is close to $p^3$ hybridization). The electron pair configuration is a regular tetrahedron shape. The molecular configuration is V-shaped, and the H—S—H bond angle is 92.1°. The dipole moment is 0.97 D. It is a polar molecule. Due to the weak H—S bond, hydrogen sulfide decomposes around 300° C.

Flash point: 260° C. Saturated vapor pressure: 2026.5 kPa/25.5° C. Solubility: Soluble in water (dissolved ratio 1:2.6), ethanol, carbon disulfide, glycerin, gasoline, kerosene, etc. Critical temperature: 100.4° C. Critical pressure: 9.01 MPa.

Hazard marking: Class 2.1 flammable gas, Class 2.3 toxic gas, highly toxic.

Color and smell: Hydrogen sulfide is colorless, highly toxic, acid gas. Hydrogen sulfide has a special smell of rotten eggs. Olfactory threshold: 0.00041 ppm. Even low concentrations of hydrogen sulfide can damage human sense of smell. When the concentration is high, there is no smell (because high concentration of hydrogen sulfide can paralyze the olfactory nerve). Using the nose as a means of detecting this gas is fatal.

The relative density is 1.189 (15☐,0.10133 MPa). It exists in low-lying areas, such as pits and basements. If you find yourself in a place where you are told that hydrogen sulfide is present, you should take immediate self-protection measures. If possible, work in a windy, high-lying area.

Explosion limit: Explosion if mixed with air or oxygen in an appropriate ratio (4.3% to 46%). Therefore, the operation site containing hydrogen sulfide gas should be equipped with a hydrogen sulfide monitor.

Flammability: The completely dry hydrogen sulfide does not react with oxygen in the air at room temperature, but it can be burned in the air during ignition. It burns in drilling and downhole operations, and the burning rate is only about 86%. When the hydrogen sulfide burns, it produces a blue flame and toxic sulfur dioxide gas. The sulfur dioxide gas will damage the eyes and lungs. When the air is sufficient, $SO_2$ and $H_2O$ are formed. If the air is insufficient or the temperature is low, free S and $H_2O$ are formed.

The chemical reaction principle in exhaust gas treatment in the Ultra-gas battery flow device:

$$H_2S+e^-=H_2\uparrow+S\downarrow$$

$$SO_2+e^-=O_2\uparrow+S\downarrow$$

$$2H_2S+SO_2=H_2O+3S\downarrow$$

<Efficacy of the Present Invention when Compared with the Prior Art Technique>

The method of the invention is controlled by the high oxidation reduction electrocatalytic water equipment to reduce the pH value of the tap water to 1-2. A specific ratio of the pH value 1-2 acid electrocatalytic water is mixed with low-quality high-sulfur iron in the tailings subject to a specific formula and then heated for a short period of time. In the process of heating, a large amount of $H^+$ in the acid electrocatalytic water is reacted with sulfur and zinc in the low-quality high-sulfur iron, and the ion state of hydrogen sulfide gas is generated. In the process of heating, the volatilization of water vapor can effectively remove the sulfur and zinc elements in the low-quality high-sulfur iron, thereby improving the quality of the iron ore to meet the steelmaking requirements.

The advantages of this method:

1. The economic benefits are large; after collecting some abandoned iron tailings and then processed, the sales price can reach 400-500 yuan (RMB)/ton.

2. After removing the zinc from the iron tailings, the service life of the steelmaking furnace is improved, and the total iron content is also significantly improved.

3. After removing the sulfur in the iron tailings, the use of ironmaking and steelmaking raw materials no longer has high sulfur content, and the problem of wasting a large amount of raw materials to cause an increase in smelting costs year by year is eliminated, and thus, the service life of the related environmental protection equipment can be relatively prolonged and the total iron content can be increased due to significant decrease in sulfur content.

4. The iron tailings regeneration technology of the present invention will not discharge harmful substances during the operation process, and the gas self-treatment and water recycling will make the operation cost can be reduced to a certain extent.

5. The iron tailings regeneration technology of the present invention is original in both the concept of governance and the content of treatment technology, and there is no competitor in the market.

DETAILED DESCRIPTION OF THE PREFERRED EMBODIMENT

The invention provides a method and system for desulfurization and dezincification of tailings. The method is to pass the tap water into a high oxidation reduction electrocatalytic water equipment for enabling the pH value of the tap water to be reduced to 1-2, then to mix the specific ratio of the pH value 1-2 acid electrocatalytic water with low-quality high-sulfur iron in the tailings subject to a specific formula and then to heat the mixture for a short period of time. In the process of heating, a large amount of $H^+$ in the acid electrocatalytic water is reacted with sulfur and zinc in the low-quality high-sulfur iron in the tailings, and the ion state of hydrogen sulfide gas is generated. In the process of heating, the volatilization of water vapor can effectively remove the sulfur and zinc elements in the low-quality high-sulfur iron in the tailings, thereby improving the quality of the iron ore to meet the steelmaking requirements. The hydrogen sulfide gas thus generated is collected into the ultra-gas battery flow device through a pipeline for further decomposition treatment. After high-sulfur iron desulfurization and dezincification, the total iron content is increased, the quality is also improved correspondingly, and the level of steelmaking is reached, so that the iron tailings which could not be used can be re-used as iron ore.

Figure 1:
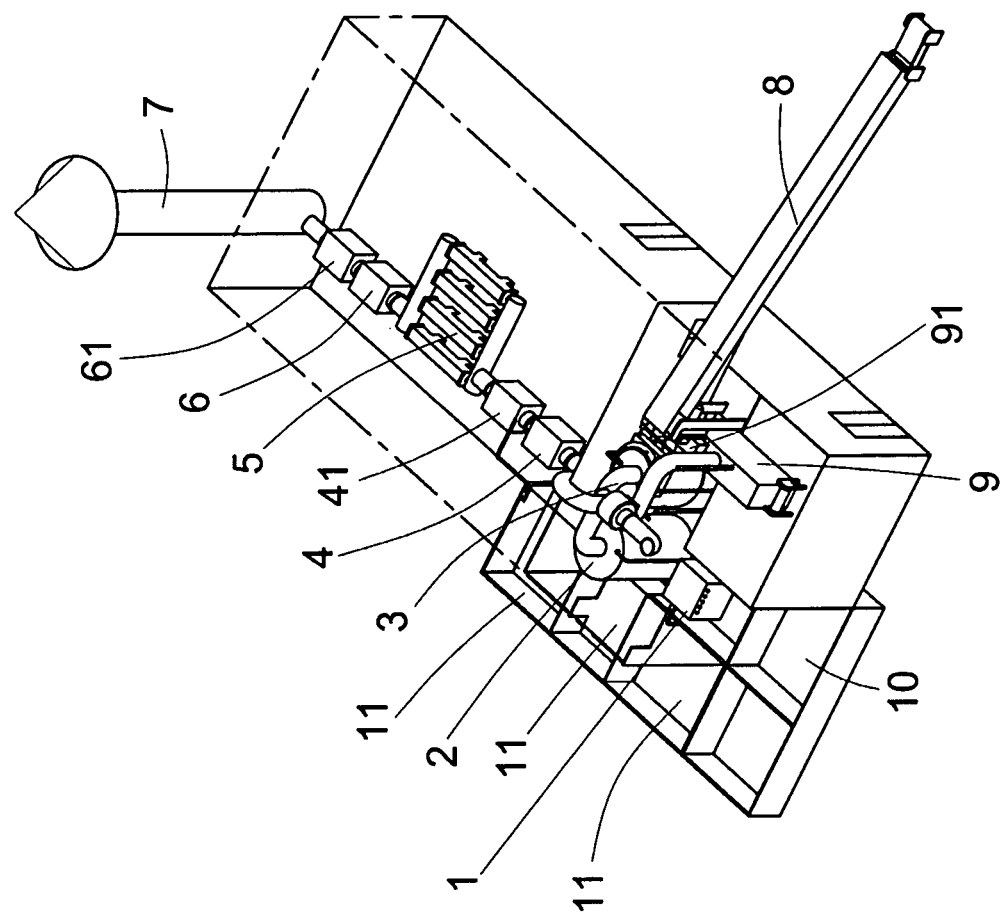
FIG. 1 is a schematic perspective view of a system for the implementation of a method for desulfurization and dezincification of tailings in accordance with the present invention.
Figure 2:
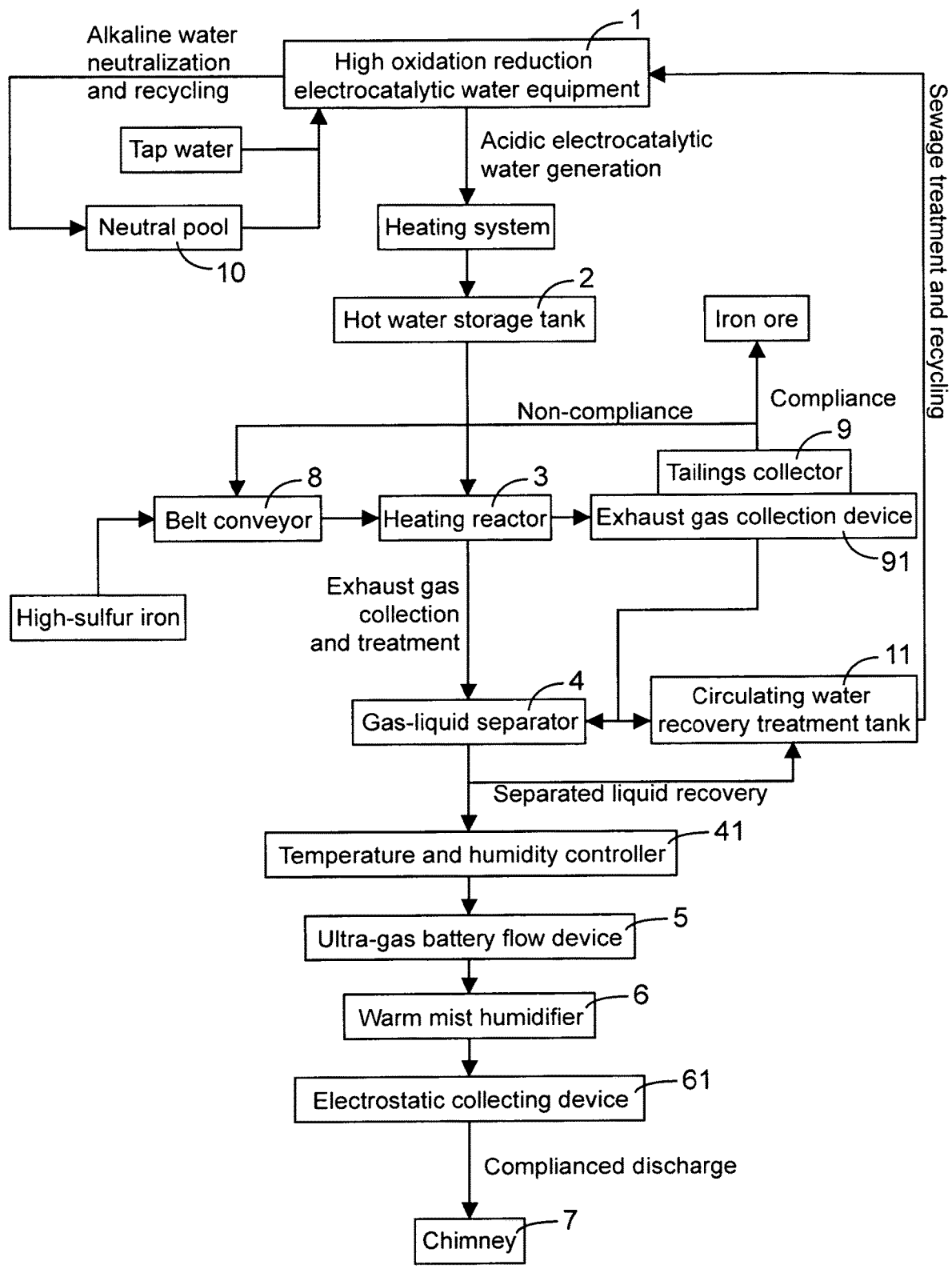
FIG. 2 is a flow block diagram of the present invention.
Figure 3:
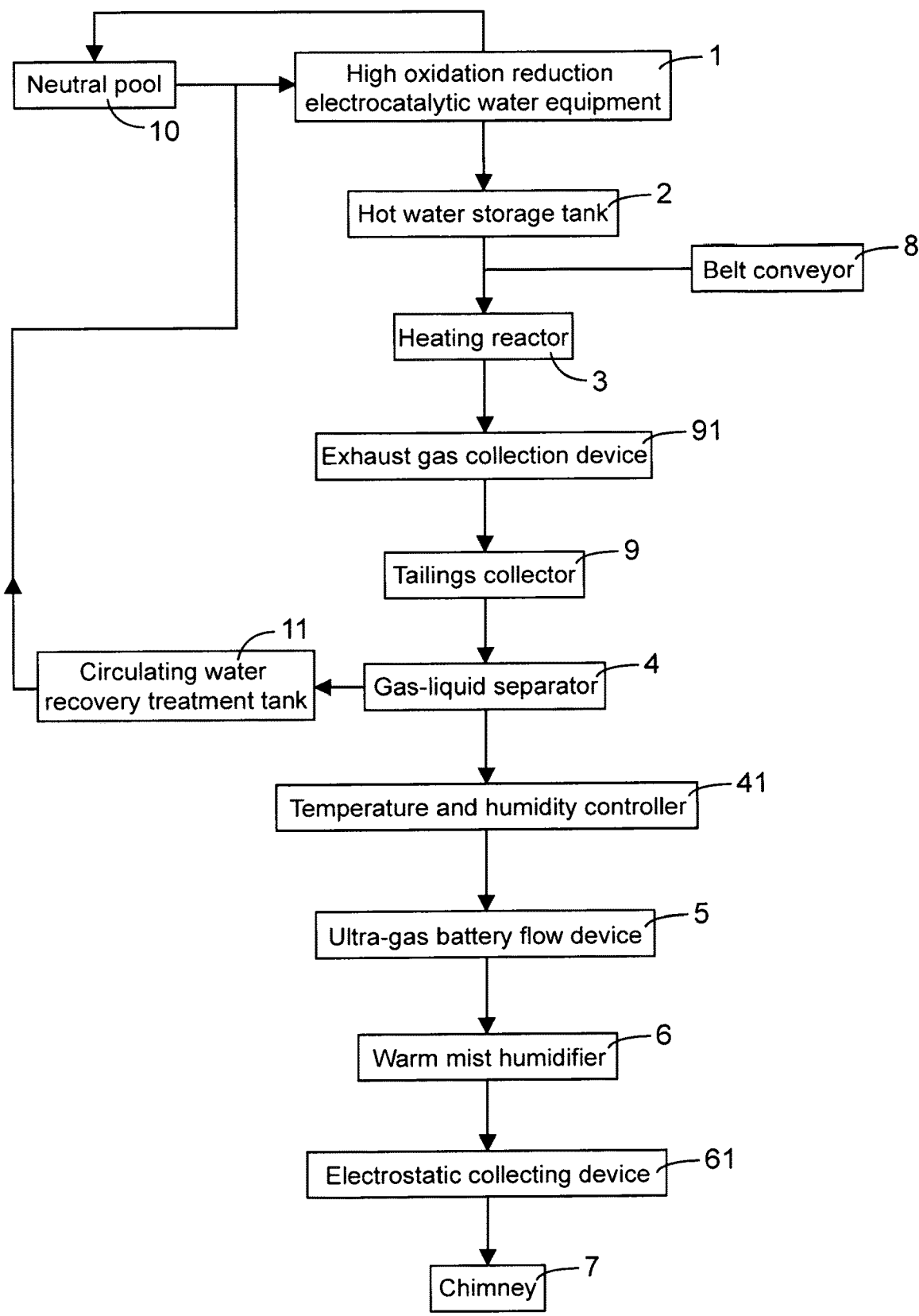
FIG. 3 is a block diagram of the present invention, illustrating the interconnection relationship of the components of the system desulfurization and dezincification of tailings in accordance with the present invention.

Referring to FIGS. 1 and 2, a system for the implementation of the aforesaid method and system for desulfurization and dezincification of tailings comprises a high oxidation reduction electrocatalytic water equipment 1, a hot water storage tank 2, a heating reactor 3, gas-liquid separator 4, a temperature and humidity controller 41, an ultra-gas battery flow device 5, a electrostatic collecting device 61, a warm mist humidifier 6, a chimney 7, a belt conveyor 8, a tailings collector 9, an exhaust gas collection device 91, a circulating water recovery treatment tank 11 and a neutral pool 10. The interconnection relationship of the foregoing components of the system is as shown in FIG. 3. Low quality high-sulfur iron in the tailings to be treated is delivered by the belt conveyor 8 into the heating reactor 3. The high oxidation reduction electrocatalytic water equipment 1 is a reactor for continuously generating high oxidation reduction water as described in China Utility Application 201120312616.4, no more instruction here. Tap water is passed into the high oxidation reduction electrocatalytic water equipment 1, enabling the pH value of the tap water to be reduced to 1-2. The pH value 1-2 acid electrocatalytic water thus obtained is mixed with the low-quality high-sulfur iron in the heating reactor 3 subject to a specific formula. Then, the heating reactor 3 is started to heat the mixture for a short period of time. In the process of heating, a large amount of H+ in the acid electrocatalytic water is reacted with sulfur and zinc in the low-quality high-sulfur iron, and the ion state of hydrogen sulfide gas is generated. In the process of heating, the volatilization of water vapor can effectively remove the sulfur and zinc elements in the low-quality high-sulfur iron thereby improving the quality of the iron ore.

The exhaust gas generated by the heating process is guided into the gas-liquid separator 4 where water vapor is separated from the exhaust gas. The exhaust gas is soluble gas. The water vapor is then guided into the circulating water recovery treatment tank 11 while the exhaust gas is guided into the ultra-gas battery flow device 5 for treatment. The ultra-gas battery flow device 5 is the technology of China Patent Application 201310090394.X "Catalyst plasma and tunnel plasma containing the same" and 201010217588.8 "Uniform electric field dielectric discharge reactor" that were invented and filed by the applicant.

After the hydrogen sulfide is decomposed by the ultra-gas battery flow device 5, a variety of crystal structures of sulfur molecules are produced, and the small molecules of sulfur are agglomerated via the warm mist humidifier 6, and finally collected by the electrostatic collecting device 61. The excessive exhaust gas is discharged from the chimney 7.

After high-sulfur iron desulfurization and dezincification, the total iron content increases, the quality is also correspondingly improved, and the level of iron ore is reached, so that the high-sulfur iron which could not be used can be re-used as iron ore.

The heat source for the aforementioned hot water storage tank 2 is derived from the hot steam introduced into the pipeline after the high-sulfur iron is heated.

The hot water storage tank 2 aims to reheat the electrocatalytic water produced by high oxidation reduction electrocatalytic water equipment 1 in order to keep the electrocatalytic water in standby state at the same time, while saving heating energy.

In the processing, the high acid reduction electrocatalytic water equipment 1 produces both acidic and alkaline water. In order to save water resources, alkaline water is transferred to the neutral pool 10 for neutralization and rapid reduction for reuse. The neutral pool 10 is separated from the water of the circulating water recovery treatment tank 11.

Since the gas-liquid separator 4 performs the gas-liquid separation process, the water vapor will be condensed. The separated gas is a soluble gas. The condensed liquid will pass through the pipeline into the circulating water recovery treatment tank 11 for treatment. In order to save energy and environmental protection, the condensed liquid can be reused after treatment.

After the above desulfurization and dezincification treatment, the iron ore will be discharged together with the molten iron to the conveyor belt leading to the tailings collector 9 for transmission (not shown).

Coal water and iron ore are solid-liquid separated by the tailings collector 9, and the high-temperature steam generated by the exhaust gas collection device 91 is collected by a pipe and a fan (not shown). Separated coal water will be passed to the circulating water recovery treatment tank 11 for treatment and recycling.

What the invention claimed is:

1. A method for desulfurization and dezincification of tailings, comprising the steps of:
    passing tap water into a oxidation reduction electrocatalytic water equipment for enabling the pH value of said tap water to be reduced to 1-2 so as to obtain a pH value 1-2 acid electrocatalytic water;
    mixing a specific ratio of said pH value 1-2 acid electrocatalytic water with said tailings to be treated subject to a specific formula; and
    heating the mixture of said pH value 1-2 acid electrocatalytic water and said tailings for a predetermined period of time to let H+ in said acid electrocatalytic water be reacted with sulfur and zinc in said tailings and to further cause generation of an ion state of hydrogen sulfide gas and sulfur dioxide gas where the volatilization of water vapor effectively removes the sulfur and zinc elements in said tailings to render iron ore therein suitable for steelmaking and the hydrogen sulfide gas and the sulfur dioxide gas thus generated are collected into an ultra-gas battery flow device through a pipeline; and
    reducing the collected hydrogen sulfide gas and sulfur dioxide gas to obtain water vapor and sulfur.

2. A system for the implementation of the method for desulfurization and dezincification of tailings as claimed in claim 1, comprising a oxidation reduction electrocatalytic water equipment, a water storage tank, heating reactor, a gas-liquid separator, a temperature and humidity controller, an ultra-gas battery flow device, an electrostatic collecting device, a warm mist humidifier, a chimney, a belt conveyor, a tailings collector, an exhaust gas collection device, a circulating water recovery treatment tank and a neutral pool, wherein said tailings to be treated are delivered by said belt conveyor into said heating reactor; the tap water is passed into said oxidation reduction electrocatalytic water equipment, enabling the pH value of the tap water to be reduced to 1-2, then the pH value 1-2 acid electrocatalytic water thus obtained is mixed with said tailings in said heating reactor subject to a specific formula, and then, said heating reactor is started to heat the mixture for a predetermined period of time; in the process of heating, H+ in the acid electrocatalytic water is reacted with sulfur and zinc in said tailings, and the ion state of hydrogen sulfide gas is generated; in the process of heating, the volatilization of water vapor effectively removes the sulfur and zinc elements in said tailings, thereby rendering iron ore therein suitable for steelmaking.

3. The system for desulfurization and dezincification of tailings as claimed in claim 2, wherein the heat source for said water storage tank is derived from the steam introduced into the pipeline after said tailings are heated; said water storage tank aims to reheat the electrocatalytic water produced by said oxidation reduction electrocatalytic water equipment in order to keep the electrocatalytic water in standby state at the same time, while saving heating energy; said electrocatalytic water is heatable by independent electric heating.

4. The system for desulfurization and dezincification of tailings as claimed in claim 2, wherein said gas-liquid separator separates generated hydrogen sulfide gas and ammonia gas from said acid electrocatalytic water, enabling the separated liquid to be delivered into said circulating water recovery treatment tank for treatment.

5. The system for desulfurization and dezincification of tailings as claimed in claim 2, wherein said gas-liquid separator recovers the water vapor in the exhaust gas by condensation; in the process of gas-liquid separation through said gas-liquid separator, the liquid is condensed, the separated gas is a soluble gas, and the condensed liquid is guided through a pipeline into said circulating water recovery treatment tank for treatment and reuse.

6. The system for desulfurization and dezincification of tailings as claimed in claim 2, wherein said exhaust gas collection device is mainly used to treat said tailings thus heated; in the process of discharging the heating reactor, water vapor, sulfur dioxide and hydrogen sulfide gas are generated and collected by said exhaust gas collection device under an enclosed environment; after desulfurization and dezincification treatment, iron ore within said tailings is discharged together with molten iron within said tailings to a conveyor belt leading to said tailings collector for transmission, and steam generated by said exhaust gas collection device is collected by a pipe and a fan, and separated coal water is passed to said circulating water recovery treatment tank for treatment and recycling.

* * * * *